United States Patent [19]

Manabe

[11] Patent Number: 5,298,997
[45] Date of Patent: Mar. 29, 1994

[54] LINE DATA-BLOCK DATA CONVERTING CIRCUIT

[75] Inventor: Katsuhiko Manabe, Tokyo, Japan

[73] Assignee: Ricoh Company, Ltd., Tokyo, Japan

[21] Appl. No.: 947,542

[22] Filed: Sep. 21, 1992

[30] Foreign Application Priority Data

Oct. 1, 1991 [JP] Japan ............................ 2-53695
Oct. 4, 1991 [JP] Japan ............................ 2-57788
Aug. 20, 1992 [JP] Japan ........................... 2-21482

[51] Int. Cl.$^5$ .............................................. H04N 07/12
[52] U.S. Cl. ...................................... 348/441; 348/384
[58] Field of Search ................... 358/140, 11, 133, 13, 358/433, 432; H04N 7/12

[56] References Cited

U.S. PATENT DOCUMENTS 4,953,019 8/1990 Skikakura et al. ............. 358/133
5,006,931 4/1991 Shirota .......................... 358/133
5,073,821 10/1991 Juri ............................... 358/13

*Primary Examiner*—Victor R. Kostak
*Assistant Examiner*—Nathan J. Flynn
*Attorney, Agent, or Firm*—Oblon, Spivak, McClelland, Maier & Neustadt

[57] ABSTRACT

A converting circuit has a memory of a capacity of at least $n \times b_{max}$ pixels when $b_{max}$ is set to the number of valid pixels in a frequency mode providing a largest number of valid pixels for one horizontal period with respect to a plurality of frequency modes. A memory controller has a read only memory (ROM) table for storing an address generating order in advance in the frequency mode of the number $b_{max}$ of valid pixels. In the memory controller, an address is generated in accordance with address generating order stored in the ROM table when line data in another frequency mode are stored in the memory. Data of $n \times b$ valid pixels are stored in the memory every n horizontal periods when the number of valid pixels for one horizontal period in the other frequency mode is set to b. In the memory controller, data of invalid pixels are store in the memory at the remaining $n \times b_{max} - n \times b$ addresses. A data mask inhibits data of $(b_{max}/n) - (b/n)$ invalid pixel blocks every n horizontal periods with respect to block data read and converted at a reading time from being outputted to the next stage.

6 Claims, 5 Drawing Sheets

Fig. 4

| | 0 | 1 | 2 | 3 | 4 | 5 | ... | 94 | 95 |
|---|---|---|---|---|---|---|---|---|---|
| | 96 | 97 | 98 | 99 | 100 | 181 | ... | 190 | 191 |
| | 192 | 193 | 194 | 195 | 196 | 197 | ... | 286 | 287 |
| | 288 | 289 | 290 | 291 | 292 | 293 | ... | 382 | 383 |
| | 384 | 385 | 386 | 387 | 388 | 389 | ... | 478 | 479 |
| | 480 | 481 | 482 | 483 | 484 | 485 | ... | 574 | 575 |
| | 576 | 577 | 578 | 579 | 580 | 581 | ... | 670 | 671 |
| | 672 | 673 | 674 | 675 | 676 | 677 | ... | 766 | 767 |

8 PIXELS
1H

1

LINE DATA-BLOCK DATA CONVERTING CIRCUIT

BACKGROUND OF THE INVENTION

1. Field of the Invention

The present invention relates to a circuit for converting line data to block data and a circuit for converting block data to line data in an image compressing system utilizing a discrete cosine transformation (DCT). In the following description, these converting circuits are called a line data-block converting circuit as a unified converting circuit.

2. Description of the Related Art

When an image is generally compressed by utilizing a discrete cosine transformation (DCT), no DCT processing can be performed with respect to a brightness signal and a color difference dot sequential signal as they are before balance modulation of these signals is performed by a subcarrier, especially, in a standard television system, concretely, in a National Television System Committee (NTSC) system and a Phase Alternation by Line (PAL) system. Namely, it is necessary to convert each of these signals to a block signal of longitudinal number n × transversal number n. In general, image data are received in the shape of line data so that it is necessary to convert data once blocked to line data. In this case, it is desirable to use a line data-block data converting circuit which all of plural operating modes of system clock frequencies different from each other can be set in both the NTSC and PAL system.

As shown in the following Table 1, there are four kinds of modes of the different system clock frequencies in the NTSC and PAL systems.

TABLE 1

| clock frequencies | systems | |
|---|---|---|
| | NTSC | PAL |
| 13.5 MHz | 720 | 720 |
| | 858 | 864 |
| 14.3 MHz | 768 | |
| | 910 | |
| 14.1875 MHz | | 752 |
| | | 908 |

For example, when a system clock frequency is set to $4 \times f_{SC} = 14.3$ MHz (in this case, a frequency $f_{SC}$ of the subcarrier is equal to 3.58 MHz) in the NTSC system, the number of horizontal valid pixels on the screen is shown by an upper number in a corresponding column in Table 1 and is equal to 768. The total number of horizontal sampling pixels including a blanking area is shown by a lower number in the corresponding column in Table 1 and is equal to 910. Similarly, in a frequency mode of 13.5 MHz in the NTSC system, the number of horizontal valid pixels is equal to 720 and the total number of horizontal sampling pixels is equal to 858. In a frequency mode of 14.1875 MHz in the PAL system, the number of horizontal valid pixels is equal to 752 and the total number of horizontal sampling pixels is equal to 908. In a frequency mode of 13.5 MHz in the PAL system, the number of horizontal valid pixels is equal to 720 and the total number of horizontal sampling pixels is equal to 864.

In each of these various kinds of frequency modes, line data sequentially transmitted in rear time are converted to a block signal of longitudinal number n × transversal number n and are transmitted to a DCT section at the next stage in real time. To perform these converting and transmitting operations, the line data-block data converting circuit has a high speed static RAM (SRAM) and a memory controller for performing a writing operation of data while a reading operation of the data is performed. When the number of horizontal valid pixels on the screen in each of the frequency modes is set to b, the number of pixel blocks transmitted as a block of longitudinal number n × transversal number n for one horizontal period (H) is equal to $b/(n \times n)$. In this case, the memory controller transmits an initial address value represented by the following first general formula to the SRAM as address information every n horizontal periods (which are shown by nH in the following description).

$$BA_{(t)} = P \times (BA_{(t-1)} MOD n) + I_n(BA_{(t-1)}/n)$$
$$\text{(remainder)} \quad \text{(quotient)}$$

The memory controller accumulatively adds the initial address value every n pixels. When this added value is equal to or greater than the number b, it is necessary to subtract the number b from this added value and add one to this subtracted value. It is necessary to transmit this final added value as address information. In contrast to this, when the above accumulatively added value is smaller than the number b, it is necessary to transmit this accumulatively added value to the SRAM as address information as it is.

When block data are converted to line data, operations reverse to the above operations are performed. At this time, an initial address value every n horizontal periods (nH) is represented by the following second general formula.

$$BA_{(t)} = n \times (BA_{(t-1)} MOD P) + I_n(BA_{(t-1)}/P)$$
$$\text{(remainder)} \quad \text{(quotient)}$$

In this second general formula, $BA_{(o)}$ designates the number of valid pixels for one horizontal period and P designates $BA_{(o)}/n$.

However, to realize a converting circuit represented by the above first and second formulas, it is necessary to dispose a divisional circuit and a modulo arithmetic (remaining) circuit so that the converting circuit is complicated. A method for storing calculated results in advance to a ROM table disposed in the memory controller has been considered to realize the converting circuit by a simplified circuit structure. However, in this method, it is necessary to dispose three ROM tables since the respective frequency modes are set by using the ROM tables. Therefore, the converting circuit is large-sized.

SUMMARY OF THE INVENTION

It is therefore an object of the present invention to provide a line data-block data converting circuit which can set all of frequency modes without making the converting circuit large-sized.

In accordance with a first structure of the present invention, the above object can be achieved by a converting circuit for converting line data to block data and for setting each of a plurality of different modes of system clock frequencies in the NTSC and PAL systems. This converting circuit comprises a memory having a capacity of at least $n \times b_{max}$ pixels when $b_{max}$ is set to the number of valid pixels in a frequency mode providing a largest number of valid pixels for one horizontal period with respect to the plurality of frequency modes and the number of pixels in a block is set to longitudinal number $n \times$ transversal number n; a memory controller having a read only memory (ROM) table for storing a predetermined address generating order in the frequency mode of the number $b_{max}$ of valid pixels; the memory controller being constructed such that an address is generated and stored in the memory in accordance with the ROM table, and data of $n \times b$ valid pixels are stored in the memory every n horizontal periods when line data in another frequency mode except for the frequency mode of the number $b_{max}$ of valid pixels are stored in the memory and the number of valid pixels for one horizontal period in the other frequency mode is set to b; the memory controller being also constructed such that data of invalid pixels are stored in the memory at the remaining $n \times b_{max} - n \times b$ addresses; and means for inhibiting data of an invalid pixel block among the block data read and converted at a reading time from being outputted to the next stage.

In accordance with a second structure of the present invention, the above object can be also achieved by a converting circuit from converting block data to line data and for setting a plurality of modes of system clock frequencies different from each other in NTSC and PAL systems. This converting circuit comprises a memory having a capacity of at least $n \times b_{max}$ pixels when $b_{max}$ is set to the number of valid pixels in a frequency mode providing a largest number of valid pixels for one horizontal period with respect to the plurality of frequency modes and the number of pixels in a block is set to longitudinal number $n \times$ transversal number n; a memory controller having a read only memory (ROM) table for storing a predetermined address generating order in the frequency mode of the number $b_{max}$ of valid pixels; the memory controller being constructed such that an address is generated and stored in the memory in accordance with the ROM table, and only data of the valid pixels of b/n blocks are received from the preceding stage and are stored in the memory every n horizontal periods when block data in another frequency mode except for the frequency mode of the number $b_{max}$ of valid pixels are stored in the memory and the number of valid pixels for one horizontal period in the other frequency mode is set to b; the memory controller being also constructed such that data of invalid pixels are stored in the memory at the remaining $n \times b_{max} - n \times b$ addresses; and means for inhibiting the data of invalid pixels among the line data read and converted at a reading time from being outputted to the next stage.

In accordance with a third structure of the present invention, in the above converting circuit having each of the first and second structures, the number of accesses of the memory by the memory controller for one horizontal period is preferably set to be a $\times n \times n$, i.e., an integer times $n \times n$ in a range in which the number of accesses does not exceed the total number of sampling pixels for one horizontal period in each of the frequency modes.

In accordance with the above first and second structures, in the converting circuit for converting line data to block data and for converting block data to line data, the memory controller has one kind of ROM table for storing an address generating order in advance in the frequency mode of the number $b_{max}$ of valid pixels. This memory controller can be commonly used in another frequency mode so that the converting circuit can be made compact. In accordance with the third structure, the number of memory accesses for one horizontal period is set to be equal to $a \times n \times n$. Accordingly, the number of pixel blocks transmitted to the DCT section or received from the DCT section for one horizontal period can be set to the integer a. Therefore, no block data are separated from each other during data transfer.

In accordance with a fourth structure of the present invention, in the case of a frequency mode other than the frequency mode of the number $b_{max}$ of valid pixels for on horizontal period, the output inhibiting means in each of the first and second structures preferably inhibits data of invalid pixels at a front or rear end of the converted data, or in portions of the front and rear ends of the converted data from being outputted to the next stage every n horizontal periods.

In accordance with the first to fourth structures, it is possible to provide a line data-block converting circuit which can set all of frequency modes without making the converting circuit large-sized.

Further objects and advantages of the present invention will be apparent from the following description of the preferred embodiments of the present invention as illustrated in the accompanying drawings.

BRIEF DESCRIPTION OF THE DRAWINGS

FIG. 4 is a view showing an address map on a RAM in the above embodiment;

DESCRIPTION OF THE PREFERRED EMBODIMENTS

The preferred embodiments of a line data-block data converting circuit in the present invention will next be described in detail with reference to the accompanying drawings.

Figure 1:
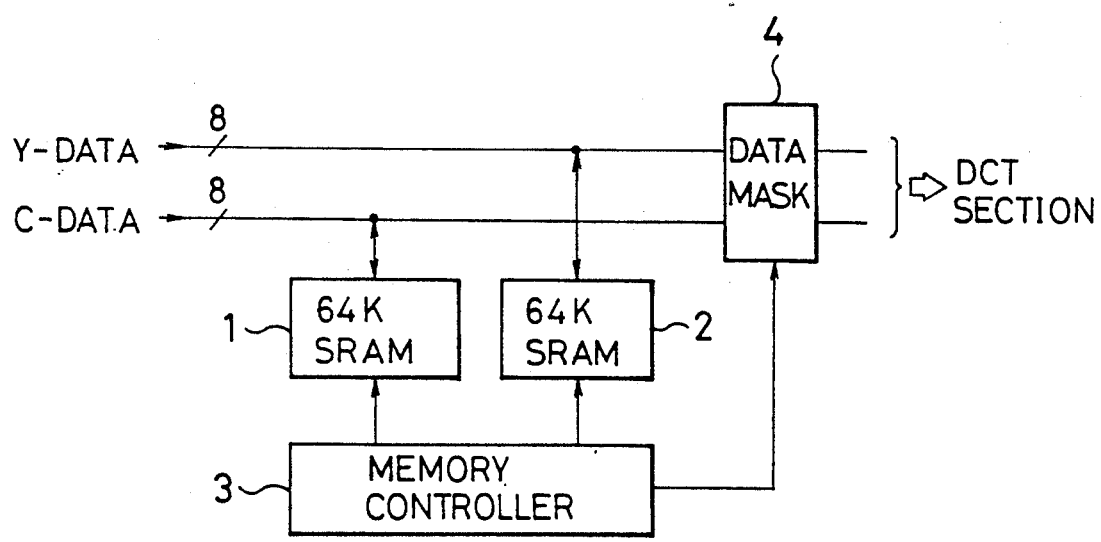
FIG. 1 is a block diagram of a circuit for converting line data to block data in accordance with one embodiment of the present invention.

FIG. 1 is a block diagram of a circuit for converting line data to block data in accordance with one embodiment of the present invention. A brightness signal Y-DATA and a color difference dot sequential signal C-DATA are respectively inputted to the converting circuit as the line data. The line data are converted to block data having the number of pixels of longitudinal number $n \times$ transversal number n and are transmitted to a discrete cosine transformation (DCT) section. In the following description, the $n \times n$ block pixels are set to $8 \times 8$ block pixels.

In FIG. 1, each of high speed static RAMs (SRAMs) 1 and 2 is disposed with respect to each of the brightness signal and the color difference dot sequential signal. Each of these SRAMs can be constructed by a memory having capacity of the number of pixels which is provided by multiplying the number 768 ($b_{max}$) of valid pixels in the mode of a system clock frequency 14.3 MHz by the number 8. This mode of the system clock frequency 14.3 MHz is selected from at least a plurality of modes of system clock frequencies different from each other in the NTSC and PAL systems, and is set in the NTSC system providing a largest number of valid pixels for one horizontal period. For example, a RAM constructed by 1024×8 words, i.e., 64 K bits can be used as the SRAM.

A memory controller 3 controls operations of the SRAMs 1 and 2. The memory controller 3 calculates an address generating order in the mode of the system clock frequency 14.3 MHz in the above-mentioned NTSC system in accordance with the above first formula. The memory controller 3 has a ROM table for storing the calculated address generating order in advance.

With respect to block data converted from line data, a data mask 4 outputs block data of valid pixels to the DCT section at the next stage and inhibits the output of block data of invalid pixels. In this embodiment, an address is generated in accordance with the above ROM table even when line data are stored in the above memory in three frequency modes except for the mode of the system clock frequency 14.3 MHz in the NTSC system. These three frequency modes are an NTSC frequency mod of 13.5 MHz, a PAL frequency mode of 14.1875 MHz and a PAL frequency mode of 13.5 MHz. The number of valid pixels for one horizontal period in each of the frequency modes is set to b in the following description. The number b is equal to 720 in the case of the NTSC frequency mode of 13.5 MHz. The number b is equal to 752 in the case of the PAL frequency mode of 14.1875 MHz. The number b is equal to 720 in the case of the PAL frequency mode of 13.5 MHz. Data of 8×b valid pixels are stored in the above memory every 8 horizontal periods. Data of invalid pixels are stored in the above memory at the remaining (8×768−8×b) addresses. The data mask 4 inhibits block data of the invalid pixels with respect to the block data read and converted at a reading time from being outputted to the next stage.

Figure 2:
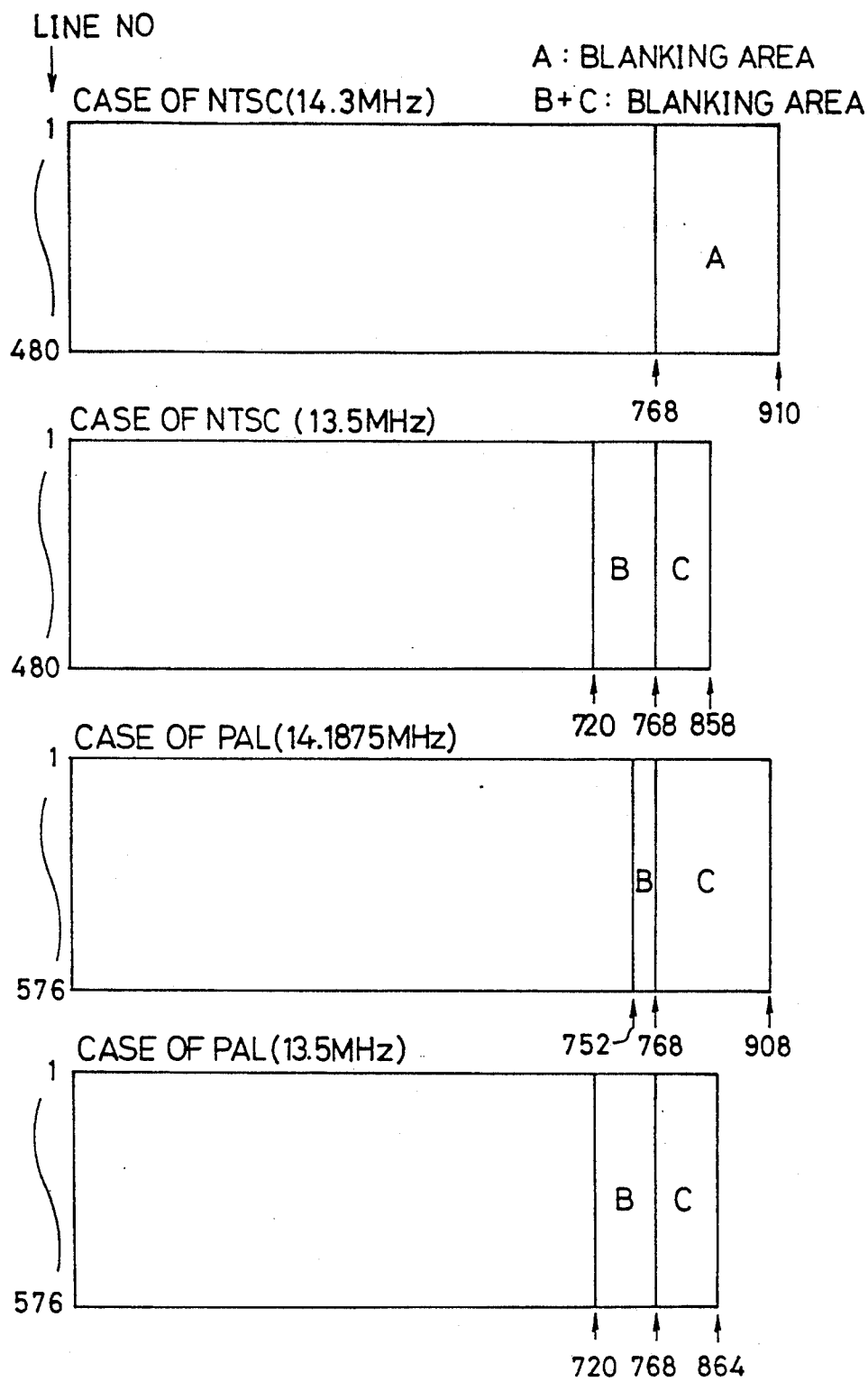
FIG. 2 is a view showing a pixel area for each of frequency modes in the above embodiment.

The above explanation will next be concretely described in detail. FIG. 2 shows a pixel area for each of the above frequency modes. In the present invention, an address generating circuit in the mode of system clock frequency 14.3 MHz is used in the NTSC system in which the number of valid pixels is largest for one horizontal period. This address generating circuit can be commonly used in the other three frequency modes. In each of these frequency modes, a memory access is performed by utilizing the fact that the total number of sampling pixels is greater than 768 for one horizontal period. This memory access in each of these frequency modes is performed in a time band in a pixel area which is shown by reference numeral B in FIG. 2 and is calculated by subtracting a valid area in each of the frequency modes from an area of 768 (=8×8×12) pixels. Namely, the memory access is apparently performed in the valid area of 768 pixels in a horizontal direction.

Figure 3:
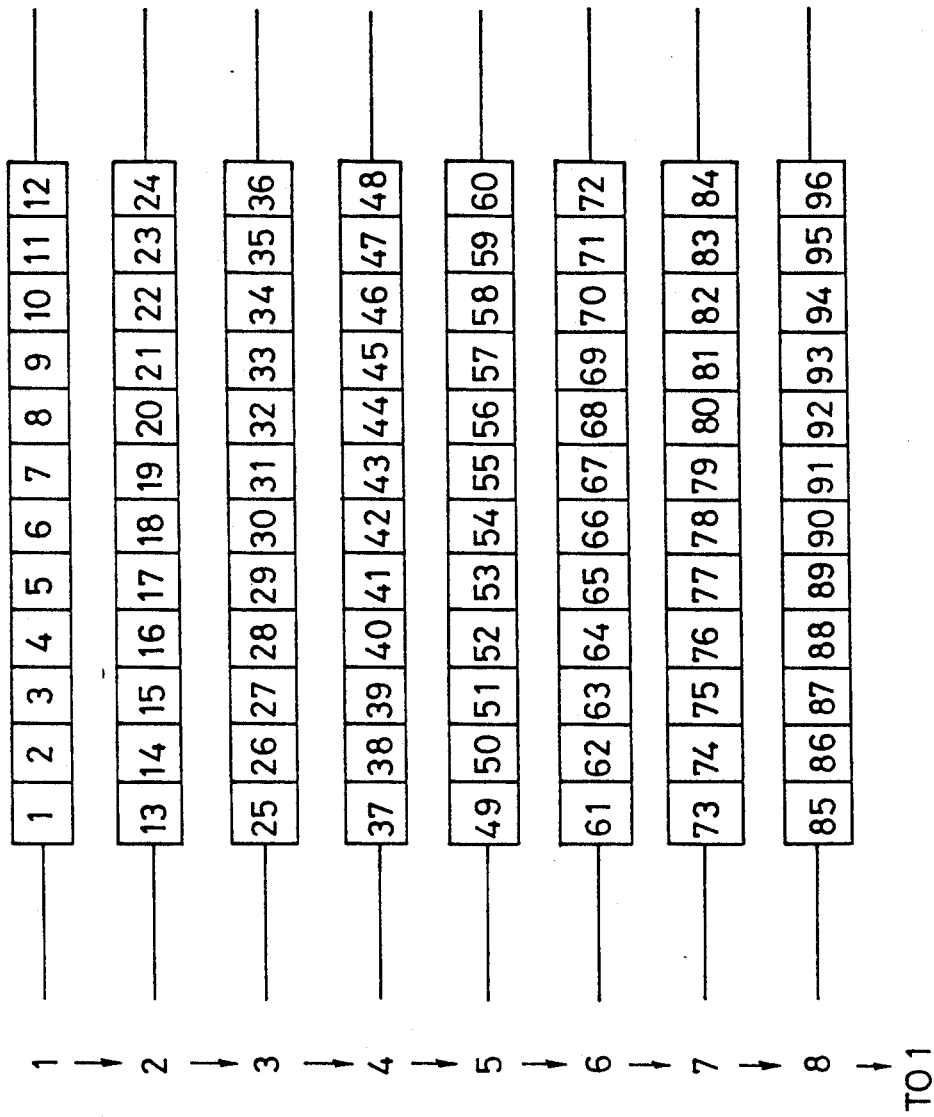
FIG. 3 is a constructional view of block data for 8 horizontal periods in the above embodiment.

As a result of such processing, data outputted from the above memory are provided as 12 pixel blocks for one horizontal period as shown in FIG. 3. In this case, invalid data are also outputted from the above memory every 8 horizontal periods (8H), i.e., every 12×8=768/8 pixels.

Concretely, the invalid data are provided as follows.

(1) The invalid data are provided by 6 (=12×8−(720/8)) pixel blocks from number 91 to number 96 in FIG. 3 in the case of the NTSC frequency mode of 13.5 MHz.

(2) The invalid data are provided by 2 (=12×8−(752/8)) pixel blocks shown by numbers 95 and 96 in FIG. 3 in the case of the PAL frequency mode of 14.1875 MHz.

(3) The invalid data are provided by 6 (=12×8−(720/8)) pixel blocks from number 91 to number 96 in FIG. 3 in the case of the PAL frequency mode of 13.5 MHz.

As mentioned above, the invalid data are outputted if the address generating circuit used in the NTSC frequency mode of 14.3 MHz is commonly used in the other frequency modes. However, there is no problem if no invalid data are transmitted to the DCT section at the next stage. Therefore, the data mask 4 inhibits the transmission of the invalid data.

In the above explanation, the output of a block of the invalid data is inhibited every 8 horizontal periods (8H) and the block of the invalid data is arranged at a rear end of converted block data. However, this block of the invalid data may be arranged at a front end of the converted block data. Otherwise, this block of the invalid data may be separately arranged at the front and rear ends of the converted block data. In this case, when the number of valid pixels for one horizontal period in each of the frequency modes is set to b, the total number of invalid pixel blocks arranged at the front or rear end of the converted block data or in portions of the front and rear ends of the converted block data is equal to (768/8)−(b/8) every 8 horizontal periods (8H). The data mask 4 inhibits block data having this total number from being outputted to the DCT section at the next stage.

The generation of an address will next be described when block data of 8×8 pixels are outputted. The NTSC frequency mode of 14.3 MHz will first be considered. When numeric values in this frequency mode are respectively substituted into the above first formula, a first initial address value every 8 horizontal periods (8H) is represented as follows:

$$BA_1 = (768/8) \times (768 \bmod 8) + I_{nt}(768/8) = 96$$

In this formula, 768 is the number of horizontal valid pixels and this number is set to 910 for one horizontal period (H) when horizontal blanking is considered. Accordingly, it is necessary to accumulatively add the value 96 to the address value every 8 pixels such that the address value is given to a RAM constructed by 1024×8 words (i.e., 64 K bits). Concretely, as shown in FIG. 4, values 0, 96, 192, 288, 384, 480, 576, 672, 1, 97,—are sequentially given to upper addresses of 10 bits every 8 pixels. In reality, the address values must be given at every pixel. Accordingly, the address values are given in the order of 0(0, 1, 2, 3, 4, 5, 6, 7), 96(768, 769, 770, 771, 772, 773, 774, 775), 192(1536, 1537, 1538, 1539, 1540, 1541, 1542, 1543),—. When the address values are represented by binary numbers, an operation shown by three lower bits is only a counting-up operation of 0, 1, 2, 3, 4, 5, 6, 7. Therefore, an explanation of this operation is omitted in the following description.

The initial address is changed every 8 horizontal periods (8H). An initial address value for the next 8 horizontal periods (8H) is represented as follows.

$$BA_2 = 96 \times (96 \bmod 8) + I_{nt}(96/8) = 12$$

For example, when the initial address value is equal to 12, upper address values of 10 bits every 8 pixels are provided in the order of 0, 12, 24, 36, 48, 60, 72, 84, 96,—.

Next, the NTSC frequency mode of 13.5 MHz as another frequency mode will be considered. In this case, an initial address value is represented as follows.

$$BA_1 = (720/8) \times (720 M \ O \ D \ 8) + I_{nt}(720/8) = 90$$

In this formula, 720 is the number of horizontal valid pixels and this number is set to 858 for one horizontal period (H) when horizontal blanking is considered. Accordingly, the value 90 is accumulatively added to the address value every 8 pixels. Thus, values 0, 90, 180, 270, 360, 450, 540, 630, 1, 91,—are sequentially given to upper addresses of 10 bits. However, it is inconvenient to respectively dispose initial address setting circuits according to the difference between the frequency modes, i.e., the difference between the numbers of horizontal valid pixels. Therefore, a line data-block data converting circuit in the present invention is constructed such that one initial address setting circuit can be used in a plurality of frequency modes in which the numbers of horizontal valid pixels are different from each other.

Namely an initial address setting circuit used in a frequency mode for providing a largest number of valid pixels for one horizontal period is commonly used in the other frequency modes. In this case, the data of a pixel block provided by dividing the difference in horizontal valid pixel number between the frequency modes by value 8 are written to the RAM as invalid data. These block data are read out of the RAM, but are not transmitted to the DCT section at the next stage.

In a method for transmitting data to the DCT section, the number of valid pixels in a frequency mode providing a largest number of horizontal valid pixels is selectively set to a multiple of $8 \times 8 = 64$. The number of pixel blocks transmitted to the next stage for one horizontal period is selectively set to an integer value. Thus, the number of pixel blocks transmitted to the next stage for one horizontal period can be selectively set to an integer value in the plurality of modes. For example, when the number of horizontal valid pixels is set to 768, the number of pixels per block is equal to $12 = 768/64$. In accordance with such a structure, no block data exist between two horizontal pixel areas so that this structure is effective in a system for processing data in a block unit.

Figure 5:
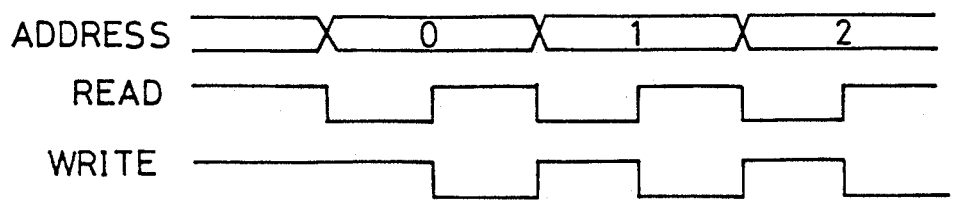
FIG. 5 is a view showing an access operation to the RAM in the above embodiment.

FIG. 5 shows an for accessing to the RAM. In this access operation, data stored in the RAM are read therefrom at each of addresses and the next data are subsequently stored immediately in the RAM.

Figure 6:
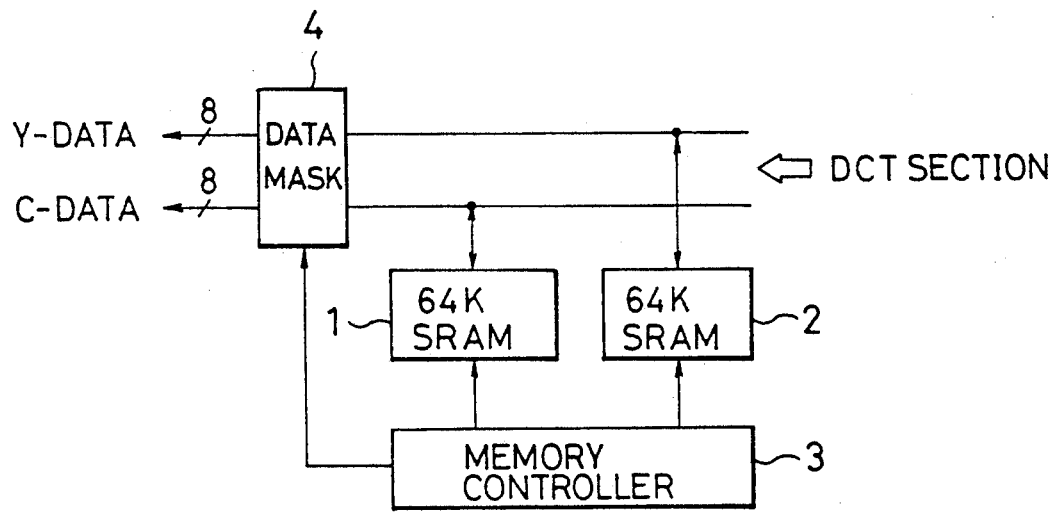
FIG. 6 is a block diagram of a circuit for converting block data to line data in accordance with another embodiment of the present invention.
Figure 6:
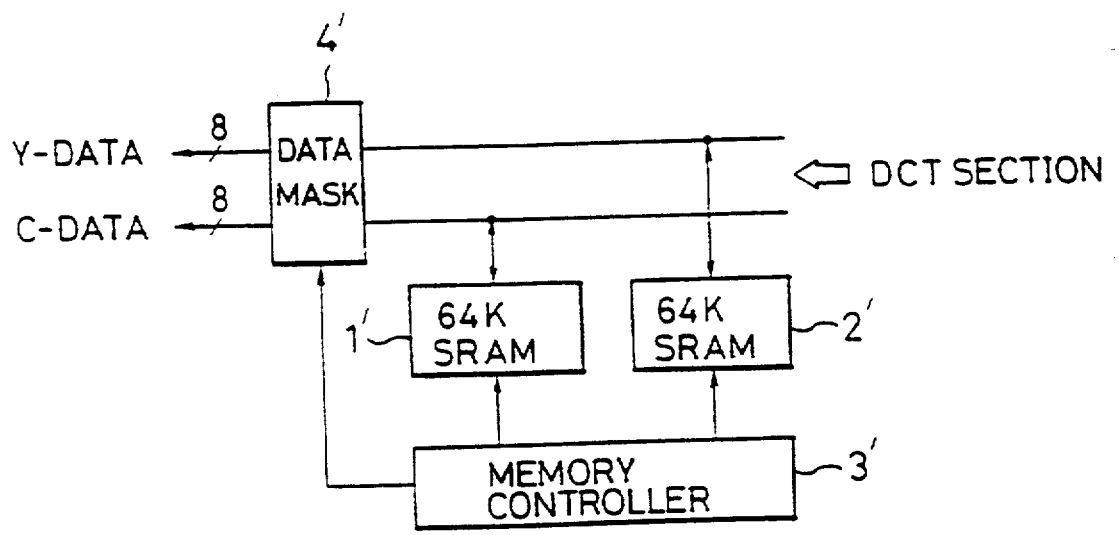

FIG. 6 is a block diagram of a circuit for converting block data to line data in accordance with one embodiment of the present invention. In this converting circuit, block data having the number of longitudinal number $8 \times$ transversal number 8 pixels are transmitted from a DCT section to an image processing section by converting these block data to line data.

In FIG. 6, each of high speed SRAMs 1' and 2' is disposed with respect to each of a brightness signal Y-DATA and a color difference dot sequential signal C-DATA, and is constructed by a memory having a required minimum capacity. For example, each of the high speed SRAMs 1' and 2' is composed of a RAM constructed by 64 K bits. A memory controller 3' controls operations of the SRAMs 1' and 2'. The memory controller 3' calculates an address generating order in the mode of a system clock frequency 14.3 MHz in the NTSC system in accordance with the above second formula. The memory controller 3' has a ROM table for storing the calculated address generating order in advance. A data mask 4' outputs only data of valid pixels among line data converted from block data to an image processing section at the next stage. The data mask 4' inhibits the output of data of invalid pixels.

In this embodiment, a converting operation completely reverse to the converting operation of the converting circuit from line data to block data shown in FIG. 1 is basically performed. Namely, an address is generated in accordance with the above ROM table even when block data are stored in the above memory in each of three frequency modes except for the mode of the system clock frequency 14.3 MHz in the NTSC system. When the number of valid pixels in this frequency mode for one horizontal period is set to b, only data of b/8 valid pixels are received from the preceding stage and are stored in the above memory every 8 horizontal periods. Data of invalid pixels are stored in the above memory at the remaining $(8 \times 768 - 8 \times b)$ addresses. The data mask 4' inhibits the data of invalid pixels among line data read and converted at a reading time from being outputted to the next stage.

The generation of an address will next be described when block data of $8 \times 8$ pixels are converted to line data. The NTSC frequency mode of 14.3 MHz will first be considered. When numeric values in this frequency mode are respectively substituted into the above second formula, a first initial address value every 8 horizontal periods (8H) is represented as follows.

$$BA_1 = 8 \times (768 M \ O \ D \ 96) + I_{nt}(768/96) = 8$$

Accordingly, it is necessary to accumulatively add the value 8 to the address value every 8 pixels such that the address value is given to a RAM constructed by $1024 \times 8$ words (i.e., 64 K bits). Concretely, values 0, 8, 16, 24, 32, 40, 48, 56, —, 1, 9, 17, —are sequentially given to upper addresses of 10 bits every 8 pixels. In reality, the address values must be given at every pixel. Accordingly, the address values are given in the order of 0(0, 1, 2, 3, 4, 5, 6, 7), 8(64, 65, 66, 67, 68, 69, 70, 71), 16(128, 129, 130, 131, 132, 133, 134, 135),—. When the address values are represented by binary numbers, an operation shown by three lower bits is only a counting-up operation of 0, 1, 2, 3, 4, 5, 6, 7. Therefore, an explanation of this operation is omitted in the following description.

The initial address is changed every 8 horizontal periods (8H). An initial address value for the next 8 horizontal periods (8H) is represented as follows.

$$BA_2 = 8 \times (8 \ M \ O \ D \ 96)_{nt}(8/96) = 64$$

For example, when the initial address value is equal to 64, upper address values of 10 bits every 8 pixels are provided in the order of 0, 64, 128, 192, 256, 320, —, 1, 65, —.

Next, the NTSC frequency mode of 13.5 MHz as another frequency mode will be considered. In this case, an initial address value is increased in the order of 8, 64, 512, 501, 413, —. It should be understood that this initial address value is clearly different from that in the NTSC frequency mode of 14.3 MHz in the order of 8, 64, 512, 261, 554,—. However, it is inconvenient to respectively dispose initial address setting circuits according to the difference between the frequency modes, i.e., the difference between the numbers of horizontal valid pixels. Therefore, a line data-block data converting circuit in the present invention is constructed such that one initial address setting circuit can be used in a plurality of frequency modes in which the numbers of horizontal valid pixels are different from each other.

In a method for transmitting data from the DCT section at the preceding stage, the number of valid pixels in a frequency mode providing a largest number of horizontal valid pixels is selectively set to a multiple of $8 \times 8 = 64$. The number of pixel blocks transmitted from the DCT section to a converting section for one horizontal period is selectively set to an integer value. For example, when the number of horizontal valid pixels is set to 768, the number of transmitted pixel blocks is equal to $12 = 768/64$. In accordance with such a structure, no block data exist between two horizontal pixel areas so that data can be processed in a block unit.

As mentioned above, in accordance with the present invention, when line data are converted to block data, or block data are converted to line data, an address generating circuit used in a frequency mode providing a largest number of horizontal valid pixels is commonly used in the generation of an address for a memory access in other frequency modes. Valid data are stored in a memory and invalid data are stored in the memory at the remaining addresses. A masking means masks the invalid data read out of the memory at a reading time and inhibits the invalid data from being transmitted to the next stage. Thus, it is possible to make the converting circuit compact.

The number of memory accesses for one horizontal period is set to be equal to $a \times n \times n$, i.e., an integer times $n \times n$. The number of pixel blocks transmitted to the DCT section or received from the DCT section for one horizontal period can be set to be equal to the integer a. Accordingly, no block data are separated from each other during data transfer so that data can be processed in a block unit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A converting circuit for converting line data to block data, said block data corresponding to a plurality of pixels, of which only valid pixels are output to a cosine transformation section, said converting circuit being used with a plurality of different system clock frequency modes in NTSC and PAL systems, said converting circuit comprising:
   a memory having a capacity of at least $n \times b_{max}$ pixels where $b_{max}$ is equal to a number of valid pixels in a selected frequency mode providing the largest number of valid pixels for one horizontal period with respect to said plurality of different system clock frequency modes and $n \times n$ is equal to the number of pixels in a block;
   a memory controller having a read only memory (ROM) tabled for storing a plurality of predetermined addresses equal in number to $n \times b_{max}$ for n horizontal periods;
   the memory controller being constructed such that data of $n \times b$ valid pixels are stored in said $n \times b_{max}$ addresses in the memory in n horizontal periods when line data in a frequency mode other than said selected frequency mode are stored in the memory and the number of valid pixels for one horizontal period in said frequency mode other than the selected frequency mode is equal to b;
   the memory controller also being constructed such that data of invalid pixels are stored in the memory at a remaining $(n \times b_{max}) - (n \times b)$ addresses of said $n \times b_{max}$ addresses; and
   means for inhibiting block data corresponding to data of said invalid pixels from being output to said cosine transformation section upon reading of data stored in said memory.

2. A converting circuit for converting line data to block data as claimed in claim 1, wherein the memory is accessed by the memory controller a $\times n \times n$ times where a is an integer value for each horizontal period in a range in which the number of accesses of said memory by the memory controller does not exceed a total number of sampling pixels in a single horizontal period in any of the different system clock frequency modes.

3. A converting circuit for converting line data to block data as claimed in claim 1, wherein, in a frequency mode other than the selected frequency mode for one horizontal period, the output inhibiting means inhibits $(b_{max}/n) - (b/n)$ invalid pixels out of a total of $b_{max}/n$ pixels in one horizontal period at a front or rear end of said blocks of valid pixels, or in portions of the front and rear ends of said blocks of valid pixels from being output to the cosine transformation section for each block in said n horizontal periods.

4. A converting circuit for converting block data, corresponding to a plurality of pixels, to line data, and receiving only valid pixels from a cosine transformation section, for each of a plurality of different system clock frequency modes in NTSC and PAL systems, said converting circuit comprising:
   a memory having a capacity of at least $n \times b_{max}$ pixels where $b_{max}$ is equal to a number of valid pixels in a selected frequency mode providing the largest number of valid pixels for one horizontal period with respect to said plurality of different system clock frequency modes and $n \times n$ is equal to the number of pixels in a block;
   a memory controller having a read only memory (ROM) table for storing a plurality of predetermined addresses equal in number to $n \times b_{max}$ for n horizontal periods;
   the memory controller being constructed such that only data of b/n blocks of valid pixels are received from the cosine transformation section and are stored in the memory in n horizontal periods when pixel block data in a frequency mode other than said selected frequency mode are stored in the memory and the number of valid pixels for one horizontal period in said frequency mode other than the selected frequency mode is equal to b;
   the memory controller also being constructed such that data of invalid pixels are stored in the memory at a remaining $(n \times b_{max}) - (n \times b)$ addresses of said $n \times b_{max}$ addresses; and
   means for inhibiting data of said invalid pixels from being output to an image processing section upon reading data stored in said memory.

5. A converting circuit for converting block data to line data as claimed in claim 4, wherein the memory is accessed by the memory controller $a \times n \times n$ times where a is an integer value for each horizontal period in a range in which the number of accesses of said memory by said memory controller does not exceed a total number of sampling pixels in a single horizontal period in any of the different system clock frequency modes.

6. A converting circuit for converting block data to line data as claimed in claim 4, wherein, in a frequency mode other than the selected frequency mode for one horizontal period, the output inhibiting means inhibits ($b_{max}-b$) invalid pixels at a front or rear end of the line data, or in portions of the front and rear ends of the line data from being received from said cosine transformation section in said n horizontal periods.

* * * * *

UNITED STATES PATENT AND TRADEMARK OFFICE
CERTIFICATE OF CORRECTION

PATENT NO. : 5,298,997

DATED : MARCH 29, 1994

INVENTOR(S) : KATSUHIKO MANABE

It is certified that error appears in the above-indentified patent and that said Letters Patent is hereby corrected as shown below:

In the Drawings:

Figure 6 attached hereto is to be substituted for Figure 6 of the issued patent.

Signed and Sealed this

Ninth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   :   5,298,997
DATED        :   March 29, 1994
INVENTOR(S)  :   Katsuhiko MANABE It is certified that error appears in the above-indentified patent and that said Letters Patent is hereby corrected as shown below:

On the title page, Item [30], the Foreign Application Priority Data should read as follows:

```
--Oct.  1, 1991 [JP]  Japan .................. 3-253695
  Oct.  4, 1991 [JP]  Japan .................. 3-257788
  Aug. 20, 1992 [JP]  Japan .................. 4-221482--
```

Signed and Sealed this

Twenty-second Day of November, 1994

Attest:

BRUCE LEHMAN

*Attesting Officer*    *Commissioner of Patents and Trademarks*